(12) United States Patent
Wang et al.

(10) Patent No.: US 12,140,992 B2
(45) Date of Patent: Nov. 12, 2024

(54) COMPUTER ARCHITECTURE HAVING SELECTABLE PARALLEL AND SERIAL COMMUNICATION CHANNELS BETWEEN PROCESSORS AND MEMORY

(71) Applicant: Wisconsin Alumni Research Foundation, Madison, WI (US)

(72) Inventors: Hao Wang, Madison, WI (US); Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/230,418

(22) Filed: Aug. 4, 2023

(65) Prior Publication Data

US 2024/0004419 A1 Jan. 4, 2024

Related U.S. Application Data

(60) Continuation of application No. 16/135,778, filed on Sep. 19, 2018, now Pat. No. 11,755,060, which is a division of application No. 14/267,190, filed on May 1, 2014, now Pat. No. 10,108,220.

(51) Int. Cl.
*G06F 1/10* (2006.01)
*G06F 3/06* (2006.01)
*G06F 13/16* (2006.01)
*G06F 13/40* (2006.01)
*G06F 13/42* (2006.01)

(52) U.S. Cl.
CPC .............. *G06F 1/10* (2013.01); *G06F 3/0635* (2013.01); *G06F 13/16* (2013.01); *G06F 13/161* (2013.01); *G06F 13/1663* (2013.01); *G06F 13/1684* (2013.01); *G06F 13/40* (2013.01); *G06F 13/4018* (2013.01); *G06F 13/42* (2013.01); *G06F 13/4234* (2013.01); *G06F 13/4243* (2013.01); *G06F 2213/0038* (2013.01); *G06F 2213/0042* (2013.01); *G06F 2213/0064* (2013.01)

(58) Field of Classification Search
CPC .......... G06F 1/10; G06F 3/0635; G06F 13/16; G06F 13/161; G06F 13/1663; G06F 13/1684; G06F 13/40; G06F 13/4018; G06F 13/42; G06F 13/4234; G06F 13/4243
See application file for complete search history.

(56) References Cited

U.S. PATENT DOCUMENTS

| 5,005,151 | A | * | 4/1991 | Kurkowski | ........... G06F 13/372 710/36 |
| 11,755,060 | B2 | * | 9/2023 | Wang | ................ G06F 13/1663 710/313 |
| 2009/0049222 | A1 | * | 2/2009 | Lee | ..................... G06F 13/1684 711/E12.001 |
| 2010/0281227 | A1 | * | 11/2010 | Walker | ................ G06F 13/1668 711/149 |

(Continued)

*Primary Examiner* — Phong H Dang
(74) *Attorney, Agent, or Firm* — Boyle Fredrickson, S.C.

(57) ABSTRACT

A computer architecture provides both a parallel memory bus and serial memory bus between a processor system and memory. Latency-tolerant memory access requests are steered to the serial memory bus which operates to increase the available memory bus bandwidth on the parallel memory. The invention also provides integrated circuit computer memory suitable for this application.

14 Claims, 3 Drawing Sheets

(56) References Cited

U.S. PATENT DOCUMENTS

| | | | |
|---|---|---|---|
| 2013/0226764 A1* | 8/2013 | Battyani | G06Q 40/04 |
| | | | 705/37 |
| 2014/0244906 A1* | 8/2014 | Hwang | G11C 8/16 |
| | | | 711/103 |
| 2015/0170731 A1* | 6/2015 | Gajapathy | G11C 7/1009 |
| | | | 365/189.16 |

* cited by examiner

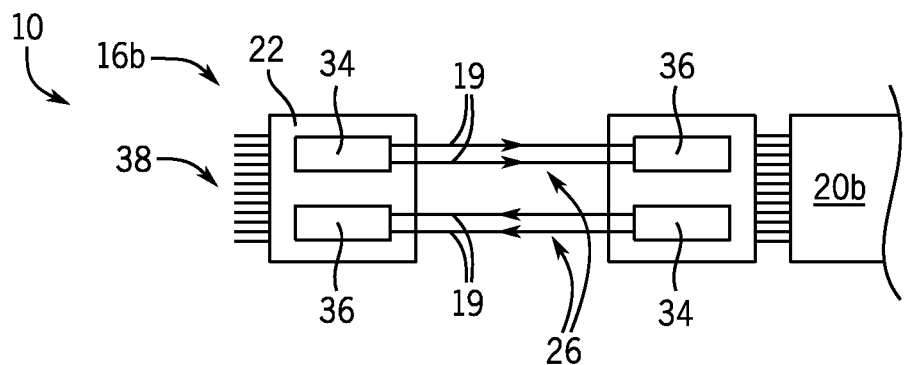
FIG. 3
FIG. 4
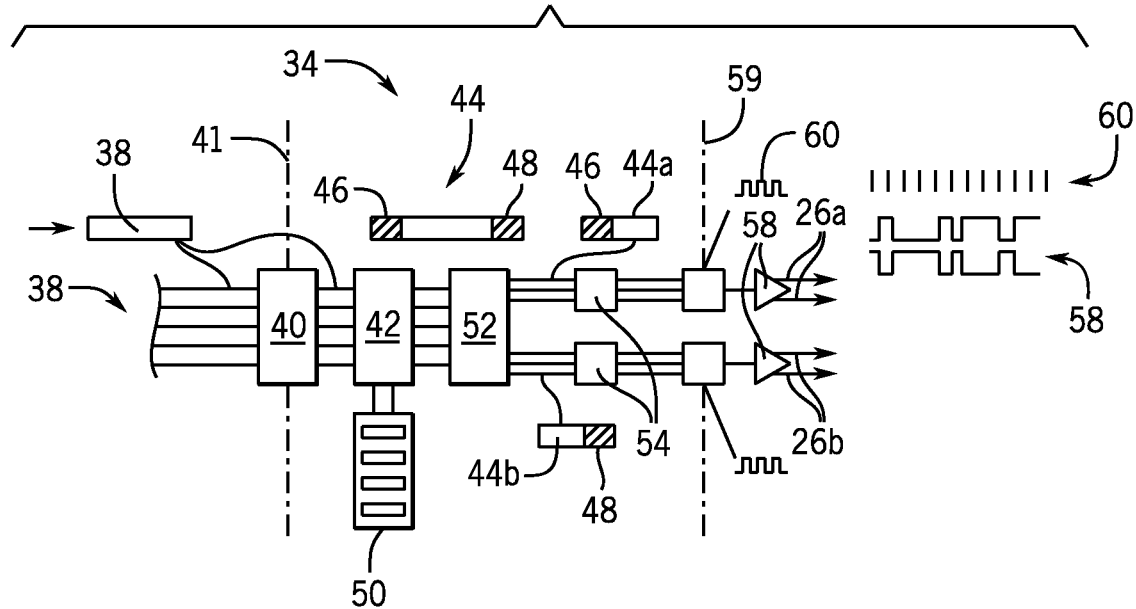
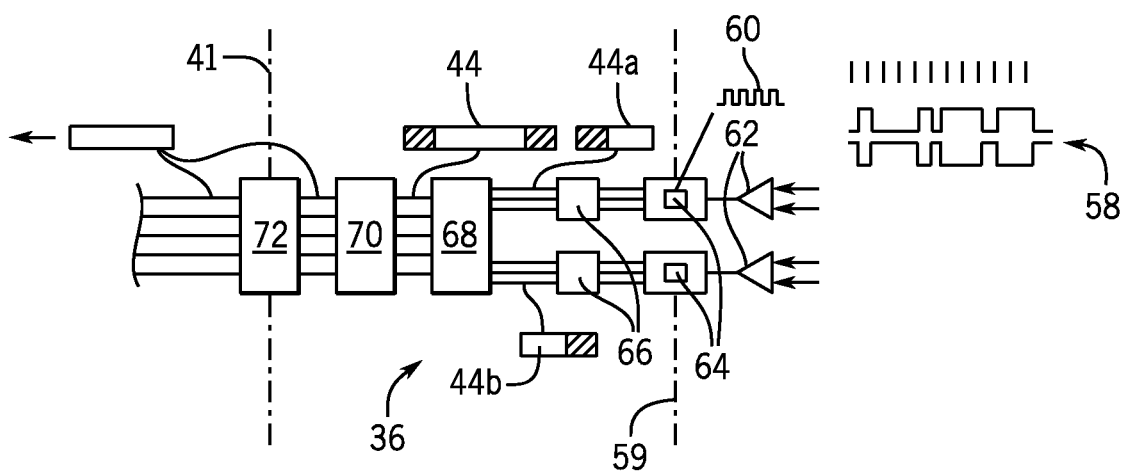

COMPUTER ARCHITECTURE HAVING SELECTABLE PARALLEL AND SERIAL COMMUNICATION CHANNELS BETWEEN PROCESSORS AND MEMORY

CROSS REFERENCE TO RELATED APPLICATION

This patent application is a continuation of U.S. patent application Ser. No. 16/135,778 filed Sep. 19, 2018 which is a divisional patent application of U.S. patent application Ser. No. 14/267,190 filed May 1, 2014 both hereby incorporated by reference.

STATEMENT REGARDING FEDERALLY SPONSORED RESEARCH OR DEVELOPMENT

This invention was made with government support under 1217102 awarded by the National Science Foundation. The government has certain rights in the invention.

BACKGROUND OF THE INVENTION

The present invention relates to computer architectures and in particular to a computer and memory system providing both parallel and serial buses for communicating between processors and memory.

Modern computer processors can process data faster than the data can be exchanged with external memory. For this reason, there is considerable interest in increasing the "bandwidth" of the memory bus communicating between processors and external memory so that faster data transfers can occur and processor speed may be better utilized.

The bandwidth of a memory bus is a function both of the transmission speed of the memory bus (the number of bits that can be transmitted per second) and the width of the memory bus (the number of bits that can be transmitted simultaneously). Typical memory buses are parallel buses employing multiple conductors that simultaneously transmit multiple bits of data words at a high bit rate. A data word is the unit of data (number of bits) that the processor can simultaneously process.

Increasing the bandwidth of a memory bus can be obtained by increasing transmission speed or memory bus width. Increasing the memory bus width, or number of parallel conductors in the memory bus, is practically limited by constraints in the number of pins (terminals) that can be physically added to processor and memory integrated circuit packages. Currently over 130 I/O pins are required for DDR3 (double data rate type III synchronous dynamic random access memory).

Increasing the speed of each parallel conductor is limited by degradation of the transmitted data resulting from increased crosstalk between parallel data lines and attenuation of the signal at high speeds. To some extent, these signal degradation problems can be addressed by increasing transmission power but at the cost of greatly increasing power usage that rises disproportionately (super linearly) to speed increases. Increasing the speed of the memory bus also causes a skewing or phase shifting of the data transmitted on separate parallel conductors with respect to the common clock, introducing errors in reconstructing the data at the end of the bus.

SUMMARY OF THE INVENTION

The present invention substantially increases memory bus bandwidth by combining a parallel memory bus with a high-speed serial memory bus. A serial memory bus normally introduces too much latency (delay between a read request and receiving the data) for general computer processors, but the present inventors have recognized that this latency can be accommodated by important special computer processors such as graphic processing units (GPU's) and streaming processors used for decoding video and audio. By selectively steering some memory traffic between the special computer processors and memory to a high latency, serial memory bus, the total memory bandwidth may be substantially increased while still providing low latency when needed by means of the parallel memory bus.

Specifically, in one embodiment, the invention provides an electronic computer having a processor system including at least a first latency-sensitive processor and a second latency-insensitive processor. The latency-sensitive processor executes a general instruction set for general purpose computation while the latency-insensitive processor executes a specialized instruction set and is less sensitive to latency in access to electronic memory than the latency-sensitive processor. An electronic memory communicates with the processor system and stores data words for reading and writing by the processor system. A parallel bus communicates between the processor system and the memory providing transmission of different bits of given data words in parallel on separate conductors of a parallel lane, and a serial bus communicates between the processor system and the memory providing transmission of different bits of given data words serially on at least one conductor of a serial lane. A memory access manager controls the memory accesses to preferentially route memory access by the latency-sensitive processor through the parallel bus and memory access by the latency-insensitive processor through the serial bus.

It is thus a feature of at least one embodiment of the invention to increase the effective bandwidth of a low-latency parallel memory bus by channeling some latency tolerant data through a high-speed serial memory bus.

The memory access manager may identify one of the parallel bus and serial bus for access of a given data word according to one of the processors first storing the given data word in the electronic memory.

It is thus a feature of at least one embodiment of the invention to provide a memory access system that can operate dynamically invisibly to the programmer and without specific program modification.

The electronic memory may include different memory banks exclusively accessible by one of the serial bus and parallel bus.

It is thus a feature of at least one embodiment of the invention to provide a simple architecture for implementing serial and parallel bus communication channels.

The electronic memory may allow access to data words according to address words wherein the parallel bus may provide transmission of multiple bits of each address word in parallel on separate conductors and the serial bus may provide transmission of multiple bits of each address word in series on at least one conductor.

It is thus a feature of at least one embodiment of the invention to allow both address and data to be preferentially directed between the two memory buses.

The serial bus may provide for multiple serial lanes and each serial lane may have an independent clock for synchronizing the serial transmission of different bits of given data words whereas the parallel lane may have a single clock for synchronizing the parallel transmission of different bits on the separate conductors. In this regard, the serial bus may employ a self-clocking protocol for transmitting multiple bits of a data word in series using a clock signal encoded in the transmission of the digital words whereas the parallel bus may employ a clock signal independent of the digital words transmitted.

It is thus a feature of at least one embodiment of the invention to provide a serial bus system that can obtain extremely high rates of transmission without data skew and thus be reasonably comparable to a parallel bus. Skew refers both to clock-to-data skew and the data-to-data skew.

The serial bus may employ a packet transmission in which multiple bits of words are transmitted in series as packets having header data and error correction data.

It is thus a feature of at least one embodiment of the invention to better accommodate high-speed transmission through the ability to provide for packet error correction, alignment, and the like.

The serial bus may employ low-voltage differential transmissions on a conductor pair wherein the parallel bus may employ single ended transmissions on a single conductor.

It is thus a feature of at least one embodiment of the invention to provide reduced crosstalk for high-speed transmission.

The serial bus may provide a bit rate on each conductor of at least 15 gigabits (Gb) per second.

It is thus a feature of at least one embodiment of the invention to provide a serial bus operating at a bit rate much in excess of the parallel bus.

The serial bus may have higher latency in communicating data words between the processor system and memory than the parallel bus.

It is thus a feature of at least one embodiment of the invention to make use of the serial bus that is unsuitable for general computer operations.

The latency-sensitive processor and latency-insensitive processor may both communicate with memory over either the serial bus or parallel bus.

It is thus a feature of at least one embodiment of the invention to permit flexible communication by either processor with shared memory when advantageous.

The memory access manager may be implemented in part by software executed on the processor system.

It is thus a feature of at least one embodiment of the invention to provide a system that can be flexibly implemented in hardware, software, or a mixture of the two.

The latency-insensitive processor is a graphics processing unit, for example, having at least 100 cores or may be a processor for streaming data selected from the group of video data and audio data.

It is thus a feature of at least one embodiment of the invention to provide a memory system that may work with many important specialized processors in use today and in the foreseeable future.

The latency-sensitive processor, latency-insensitive processor and at least a portion of the parallel bus and serial bus are integrated circuits integrated on a common substrate.

It is thus a feature of at least one embodiment of the invention to provide a memory bus structure that increases memory bandwidth while respecting a constraint on device physical pins or terminals.

The invention may also provide an electronic memory device suitable for use in this bus structure and including a package housing providing a set of conductive terminal points allowing electrical communication from circuitry within the package housing to circuitry outside of the package housing. An integrated circuit may be held within the package housing and provide at least one storage element with memory cells for the access of data words, the memory cells arranged in addressable logical rows and columns according to an address word. The integrated circuit may also provide a serial interface communicating with the storage element implementing serial communication of data words, where different bits of given data words and address words are communicated between the storage element and circuitry outside the package housing through at least one terminal point.

It is thus a feature of at least one embodiment of the invention to provide a novel memory device that employs a compact serial transmission protocol.

The data words have a bit length exceeding the number of terminal points.

It is thus a feature of at least one embodiment of the invention to permit memory architectures that avoid physical pin constraint issues.

Each column address may access a row of memory cells having access width wherein the data word may equal the access width.

It is thus a feature of at least one embodiment of the invention to permit wider memory read/write access operations possible with serial data transmission that if implemented with parallel data transmission would exceed the number of device pins possible.

The electronic memory device may include an address mask circuit selecting only a portion of a data word or address word received over the serial interface for access of the storage element.

It is thus a feature of at least one embodiment of the invention to permit multiple electronic memory devices to share a given serial communication lane.

These particular objects and advantages may apply to only some embodiments falling within the claims and thus do not define the scope of the invention.

BRIEF DESCRIPTION OF THE FIGURES

FIG. 3 is a detailed block diagram of the transmitters and receivers of communicating transceivers providing one lane of the serial memory bus associated with the processor system and the external memory;

FIG. 4 is a detailed block diagram of one transceiver of FIG. 3 showing various clock domains;

DETAILED DESCRIPTION OF THE PREFERRED EMBODIMENT

Figure 1:
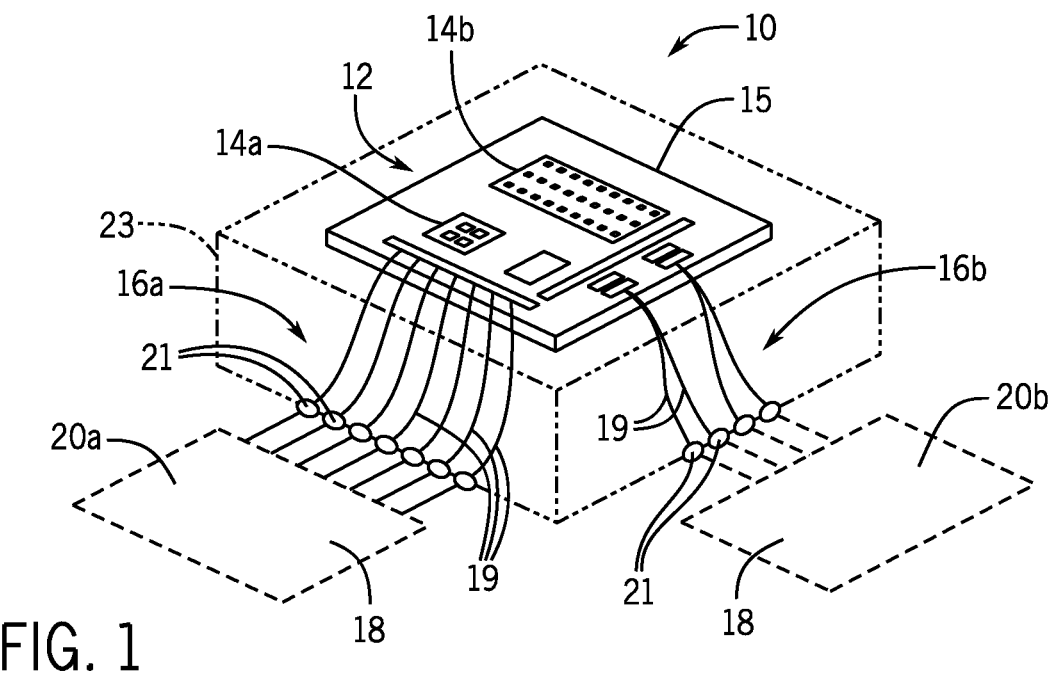
FIG. 1 is a simplified perspective view of an integrated circuit substrate having multiple circuit components including a processor system and portions of a parallel and serial memory bus communicating with off-substrate external memory.

Referring now to FIG. 1, an integrated circuit 10, for example, providing a single-chip heterogeneous processor (SCHP) system may include a processor system 12 including heterogeneous general processors 14*a* and 14*b* incorporated on a single integrated circuit substrate 15. General processors 14*a* in turn may comprise more standard computer processors executing a complex instruction set for general purpose scalar processing. Examples of such general processors include those supporting standard operating systems such as Windows, OSX, Linux and the like.

In contrast, specialized processors 14*b* may comprise one or more specialized processors executing a specialized instruction set, for example, on stream or vector data. Examples of such specialized processors 14*b* include graphic processing units (GPUs) and stream processors such as video processors operating on video stream data or audio processors operating on audio stream data, each amenable to highly parallelizable processes. General processors 14*a* will have less tolerance to latency between the general processor 14*a* and external memory than specialized processors 14*b*. Latency refers to the delay in obtaining data from external memory and is distinct from the data rate at which data can be obtained from external memory after an initial delay. Because of this characteristic, general processors 14*a* will be termed latency-sensitive processors and specialized processors 14*b* will be termed latency-insensitive processors.

The processor system 12 may communicate with an external memory 18, for example, comprised of dynamic random access memory (DRAM), through two different bus systems. The first bus system is a serial memory bus 16*b* communicating with a first memory bank 20*b* of the external memory 18 and the second bus system is a parallel memory bus 16*a* communicating with bank 20*a* of the external memory 18.

Figure 2:
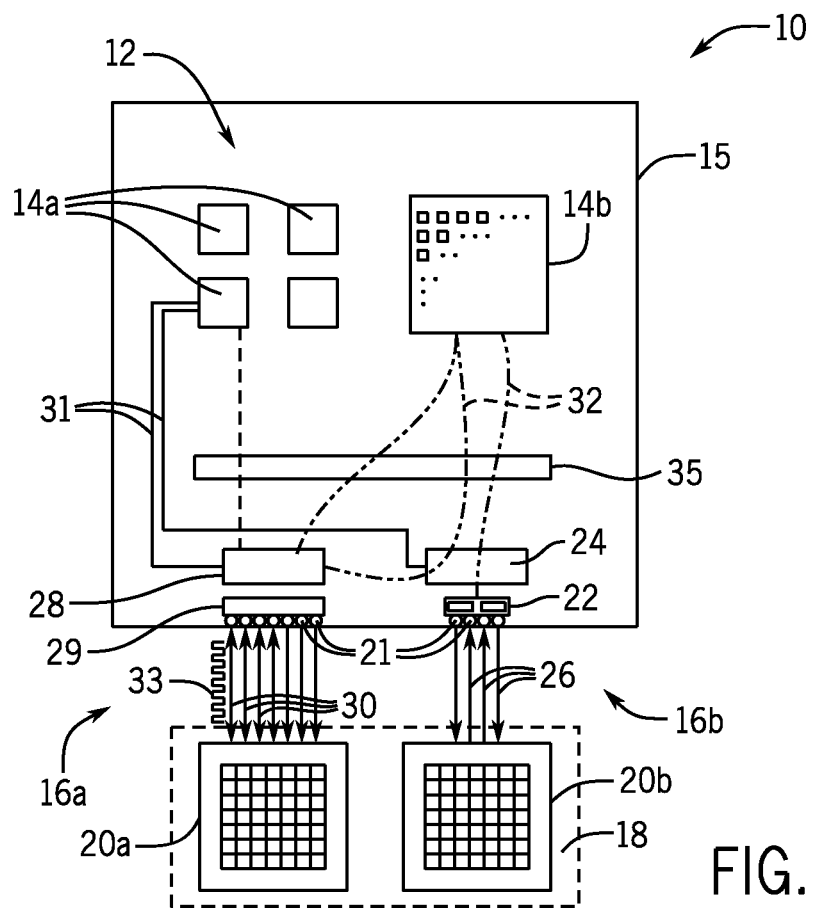
FIG. 2 is a block diagram of the integrated circuit substrate of claim 1 showing dataflow paths between the processor system and the parallel and serial memory bus.

Referring now also to FIG. 2, in one example, the serial memory bus 16*b* may be managed by a memory management unit 24 controlling one or more of the serial transceivers 22 while the parallel memory bus 16*a* may be managed by a memory management unit 28 controlling a parallel transceiver 29. The memory management units 24 and 28 generally provide for a mapping between an address space used by general processors 14*a* and specialized processors 14*b* and actual physical addresses in the banks 20*b* and 20*a*.

It will be appreciated that there can be multiple memory management units 24 (i.e., MMU, or memory controllers) connected to multiple sets of serial lanes. In other words, one MMU 24 can have at least one serial lane (and can have more) and there can be multiple such MMUs. Also, there can be more than one MMU 24 for parallel bus channel (but each MMU typically is attached to only one parallel bus channel).

The serial transceivers 22 and parallel transceiver 29 communicate with the external memory 18 by conductors 19 passing from terminals 21 supported on a package or casing 23 holding the integrated circuit 10. The terminals 21 (often referred to as pins) provide interface between integrated circuit 10 and external devices through a casing 23 protecting and holding the integrated circuit 10. The number of terminals 21 (often referred to as pins) is generally limited in number and subject to practical constraints in the manufacture of casings 23 for integrated circuits 10.

Referring to FIG. 2, the serial transceiver 22 may be located on the substrate 15 and may receive data from the memory management unit 24 in parallel format and convert that data into a serial format for transmission on one or more lanes 26 to the memory bank 20*b*. Only one serial transceiver 22 is shown; however, the invention contemplates the use of multiple such transceivers as will be described. Each lane 26 may provide either a forward lane communicating data and addresses from the integrated circuit 10 to the external memory 18 or may be a backward lane communicating data from the external memory 18 to the integrated circuit 10.

Similarly, the parallel memory bus 16*a* may be located on the substrate 15 and may receive data from the memory management unit 28 in parallel format to communicate that data over multiple parallel conductors 30 each of which can communicating a single bit at a time and each being either forward conductors communicating data and addresses from the integrated circuit 10 to the external memory 18 or backward conductors communicating data from the external memory 18 to the integrated circuit 10.

The parallel memory bus 16*a* differs from the serial memory bus 16*b* in a number of respects. First, and most generally, a given multi-bit word (being logically collected bits of either address or data), when communicated between the integrated circuit 10 and the external memory 18, will have different bits transmitted simultaneously on multiple conductors 30 in the parallel memory bus 16*a* but will have different bits transmitted sequentially on at least one lane 26 in the serial memory bus 16*b*. In some cases, large multi-bit data words may be broken into sequential portions in the parallel memory bus 16*a* (albeit with most of the bits transmitted in parallel) and large multi-bit data words may be broken into parallel operating serial lanes 26 in the serial memory bus 16*b* (albeit with most of the bits transmitted in series). Accordingly, the predominant method of data transmission defines the bus.

Second, the parallel memory bus 16*a* may use one conductor 30 as a clock signal 33 shared among multiple of the other conductors 30 and used in decoding the data transmitted at the correct time. This shared clock signal 33 creates data transmission rate limitations in the parallel memory bus 16*a* caused by time skewing in the transmitted data that may cause it to move from proper alignment with the clock signal 33. Two types of time skewing exist including skewing between the clock and the data (clock-to-data) and skewing between data on different conductors 30 (data-to-data).

In contrast, the serial memory bus 16*b* provides a clock signal with each serial lane 26. Preferably this clock signal is provided by an embedded clock protocol which incorporates the clock timing into the actual data transmitted as will be discussed below. For this reason, separate lanes 26 are substantially immune from problems of skew with other lanes 26. This is one reason the bit rate of transmission in a lane 26 of the serial memory bus 16*b* may be much higher than the bit rate of transmission in a conductor 30 of the parallel memory bus 16*a*. For example, the parallel memory bus 16*a* will practically be limited to less than 5 Gb per second on each conductor 30 whereas the serial memory bus 16*b* may provide speeds of greater than 7 Gb per second per conductor and typically greater than 10 Gb per second per conductor. Generally two conductors are required for each lane 26 as will be discussed below so the actual transmission speed per lane is twice as high.

Third, the serial memory bus may employ a differential transmission mode which substantially reduces crosstalk and the effects of electrical noise allowing higher transmission rates. For high transmission rates, the serial memory bus 16*b* may exhibit a much lower energy use per bit transmitted than the parallel memory bus 16*a*, largely because of the large power usage required to drive the parallel interface bit rates in the face of substantial cross-talk and skew problems (which can be reduced by higher charging rates). Energy use is important in reducing the power consumption of the product (particularly for mobile devices) and in reducing cooling requirements.

Despite the clear advantage of the serial memory bus 16b in terms of bandwidth, the serial memory bus 16b exhibits more latency than the parallel memory bus 16a. Latency is the delay in the transmission of data as distinct from the rate of transmission of data. Latency can be high despite a high-bandwidth communication lane, for example, because of delays in pairing the data for serial transmission. The serial memory bus 16b, for example, may provide a latency of greater than 13 ns (the approximately latency of current DRAM that may make up the external memory 18), for example, 30 ns or more. While this latency is substantially limiting with respect to the general processors 14a, it can be readily tolerated by specialized processors 14b. Accordingly, the present invention preferentially lanes communications between specialized processors 14b through the serial memory bus 16b and communications between the general processors 14a through the parallel memory bus 16a.

This channeling may be accomplished in several ways. In a software approach, one of the general processors 14a may be assigned the task of memory allocation and may provide signals 31 to the memory management units 24 and 28 mapping data used by the general processors 14a to memory bank 20a (such as is exclusively associated with the parallel memory bus 16a) and mapping the data used by specialized processors 14b to the memory bank 20b (such as is exclusively associated with the serial memory bus 16b). This mapping is shown by dotted lines 32. Instances when specialized processor 14b needs to access memory bank 20a (shown by dotted line 32) or general processors 14a need to access memory bank 20b are handled by redirecting the request to the appropriate memory management unit by a common interconnecting bus. The software may be implemented as part of the operating system kernel, an operating system driver, a separate program or a combination of any of these or the like. Generally, depending the given address of data being accessed will be used to determine which MMU 24 or 28 to use. Normally a given data element, once stored, will be accessible only through one of the parallel memory bus 16a or serial memory bus 16b, depending on the memory bank 20a or 20b in which it is stored. Yet either processor 14a or 14b may access that data element by using the appropriate memory bus 16a or 16b.

In a hardware approach, a configuring switch 35 may provide for this steering of memory access as driven by a hardware monitoring of the source or destination of data to or from general processor 14a or specialized processor 14b and directing it to the appropriate memory management unit 24 or 28.

Referring now to FIG. 3, as noted above, the serial memory bus 16b may provide a serial transceiver 22 at the integrated circuit 10 and associated with the memory bank 20b. Each serial transceiver 22 may include both a transmitter 34 and a receiver 36. The transmitter 34 receives parallel data 38 from the integrated circuit 10 and converts it into serial data transmitted along a pair of conductors 19 of a forward lane 26 to a corresponding receiver 36 at the memory bank 20b. As noted, this transmission process may preferably use a low-voltage differential transmission (LVDT) in which adjacent conductors have the same data driven in opposite polarities to reduce electromagnetic interference and cross-talk with other lanes 26, contributing in part to the higher data rate possible with the serial memory bus 16b.

The receiver 36 of transceiver 22 may receive serial data along conductors 19 of a backward lane from transmitter 34 of memory bank 20b and convert that into parallel data 38 for use with the integrated circuit 10.

Referring now to FIG. 4, a transmitter 34 will generally receive the parallel data 38 from a processor 14a or 14b into a first buffer 40 providing first-in, first-out (FIFO) asynchronous buffering. This buffering allows the data rate of data received by the buffer 40 to differ from the data rate of data output by the buffer 40 across a clock boundary 41 to accommodate the different clock domains used in the integrated circuit 10 and in the transmitter 34 with respect to parallel data 38. This buffer 40 provides a first contribution to latency.

The buffered parallel data 38 is then received by a packetizer 42 which converts each word of parallel data 38 into a data packet 44 having a header 46, used for identification and synchronization of the packet 44 in serial transmission, and a footer 48 typically being error detection and correction codes of the type known in the art. Each packet 44 is also stored in a packet buffer 50 in the event that retransmission is required.

The packets 44 are then transmitted to a lane distributor 52 which may separate the packet into a first packet portion 44a and a second packet portion 44b for transmission on separate lanes 26a and 26b so that an arbitrarily large transmission bandwidth can be generated.

Prior to final transmission, the packet portions 44a and 44b are processed by encoders 54 to embed a clock signal in the packet transmission, for example, using 8b10b encoding that maps 8-bit symbols to 10-bit symbols to achieve DC balance and to provide sufficient state changes to encode a clock in this signal. The encoded packet portions 44a and 44b are then transmitted to serializers 56 which convert the parallel data into serial data and provide the serial data to differential drivers 58 for transmission according to techniques well known in the art. This serialization converts from a clock domain of the transmitter 34 into the bit clock used for serial transmission across a clock boundary 59 and also contributes to latency. As noted, the serial data employs LVDT encoding and has an embedded clock signal 60 (not transmitted but implicit in the encoding).

Conversely the receiver 36 may receive encoded data of the type produced by a transmitter 34 at differential amplifiers 62, the latter extracting serial binary data based on the difference between the LVDT encoded signals. This serial data is provided to a de-serializer 64 which extracts a clock signal 60 used in the decoding process to reconstruct parallel 8b10b encoded data. This de-serialization process again crosses the clock boundary 59 and introduces some latency into the decoding process. The parallel data is then provided to the decoders 66 which convert the 8b10b encoded data into the packet portions 44a and 44b which are reassembled by a lane merger 68 and then depacketized by the de-packetizer 70 to be buffered in an asynchronous FIFO buffer 72, across clock boundary 41, resulting in words of parallel data 38.

Figure 5:
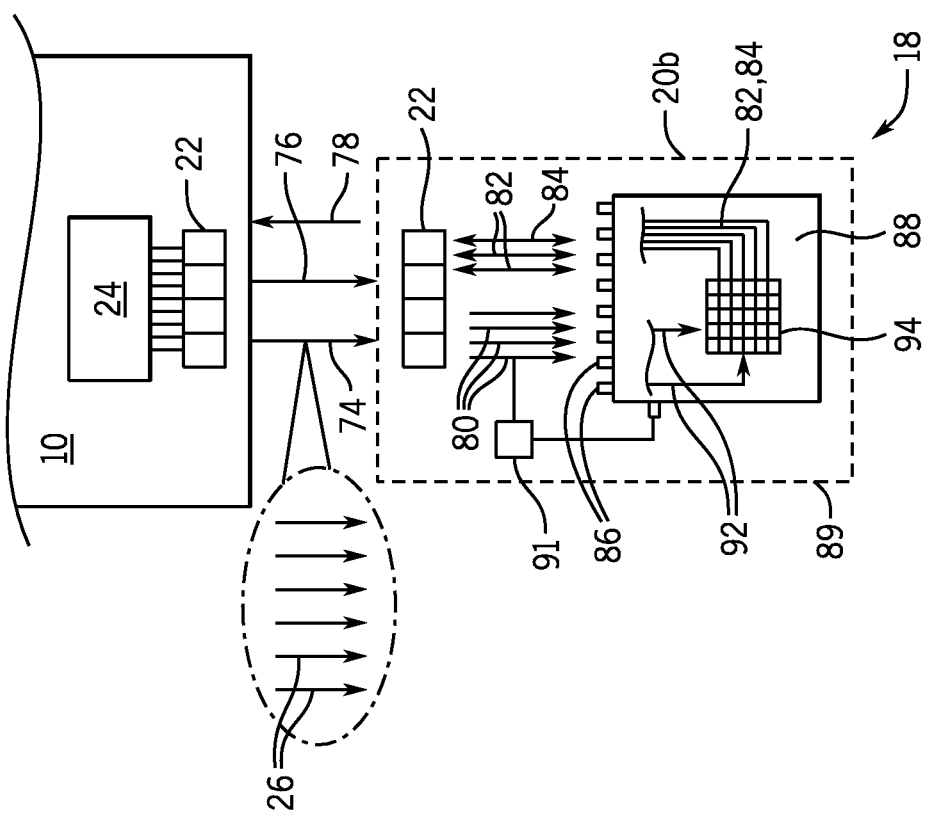
FIG. 5 is a block diagram of a first embodiment of the present invention using an external memory system having an off-substrate serial-to-parallel converter and working with conventional memory integrated circuits.

Referring now to FIG. 5, in a first example embodiment, integrated circuit 10 may provide for a set of serial transceivers 22 sufficient to generate three forward lanes 26 for addresses sent over a forward link 74, two forward lanes (not shown) for right write data in a forward link 76, and six backward lanes (not shown) for read data, in a backward data link 78.

These links 74, 76, and 78 are received by a serial transceiver 22 associated with bank 20b that converts the serial data to a set of parallel data lines including parallel forward address lines 80, parallel forward data lines 82, and parallel backward data lines 84. The combined width of the address lines 80 and the data lines 82 and 84 generally match the address and data pins 86 on a standard dynamic RAM integrated circuit 88. Thus, for example, the parallel forward data lines 82 may be limited to eight lines for a standard 8-bit byte.

Generally, multiple RAM integrated circuits 88 may be collected on a circuit card 89 including a decoder 91 that may receive the addressed lines 80 to control selectively chip enable inputs on the RAM integrated circuits 88 so as to steer addresses to particular different RAM integrated circuits 88.

Inside of each RAM integrated circuit 88, the parallel forward address lines 80 are converted into column and row access lines 92 that are used to access memory cells 94 arrayed logically in rows and columns. Generally the length of the columns can be thousands of bits long, far greater than the width of data lines 82, for example, of eight bits.

Figure 6:
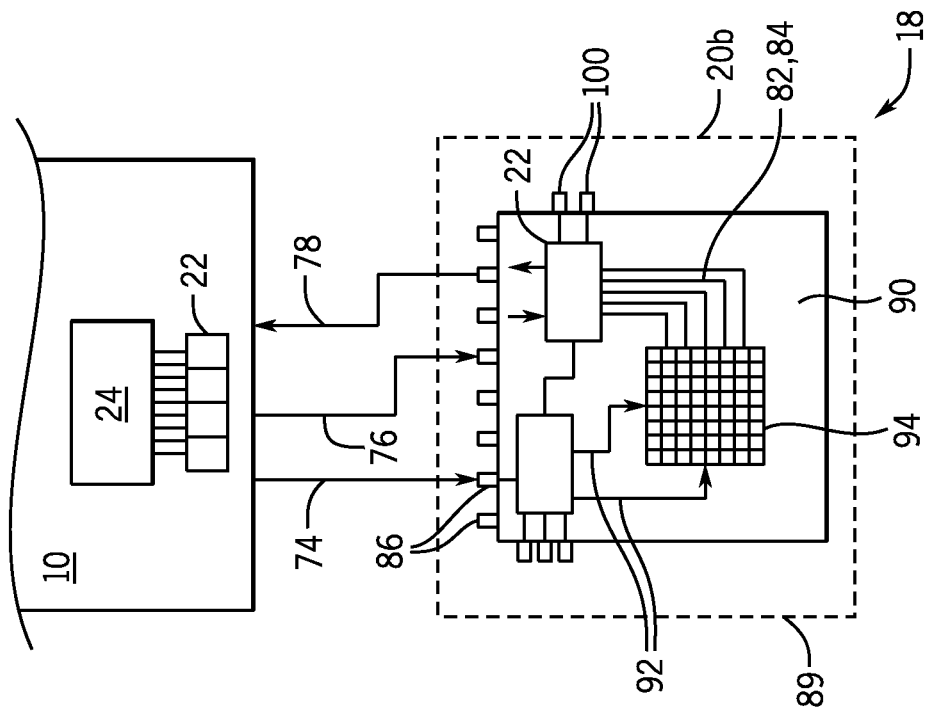
FIG. 6 is a block diagram of a second embodiment of the external memory system having an on-substrate serial-to-parallel converter as part of a specialized memory integrated circuit.

Referring now to FIG. 6, the present invention contemplates that the serial transceiver 22 associated with memory bank 20 of external memory 18 may be integrated within the RAM integrated circuit to provide a serial-access RAM integrated circuit 90. By placing the serial transceiver 22 inside the integrated circuit 90, the limitation of the device pins 86 may be mitigated, allowing, for example, the width of the parallel forward data lines 82 and parallel backward data lines 84 to be greatly expanded as well as allowing a reduction in the number of device pins 86 required for address and control data. For example, a given memory address may read out a data word that is larger than the number of pins 86 on the integrated circuit 90. This expansion is particularly significant because the access latency of DRAM is fundamentally limited by the number of pins 86 on the integrated circuit package. DRAM has a much higher potential bandwidth than is normally obtained because each internal read reads a row of memory cells many thousands of bits wide. Accordingly parallel data words of much greater length may be implemented reducing the RAM latency.

It will be appreciated that the serial transceiver 22 may receive address filter inputs 100 that may be used in the same manner as the traditional chip enable inputs to provide that the integrated circuit 90 responds only to a subset of possible addresses that may be received at the serial transceiver 22. This allows the serial transceiver 22 to receive the serially formatted memory access data intended for multiple integrated circuits 90 and to respond only to those in a subset of those addresses relevant to the particular integrated circuit 90. The serially formatted memory access data over the links 74, 76, and 78 may be received in parallel by multiple integrated circuits 90 or in series in a daisy chain fashion. In this latter case, the serial transceivers 22 provide for buffering capabilities that allow insertion of relevant data from each integrated circuit 90 into a passing serial transmission.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network. The term "pins" used herein is intended to denote electrical terminals between an integrated circuit housing and the external circuitry such as may be realized by conductive pins, tabs, or other conductive interfaces for example as used in surface mount devices.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic memory device comprising:
   a package housing providing a set of pins allowing electrical communication from circuitry within the package housing to circuitry outside of the package housing; and
   a circuit held within the package housing and including:
      at least one dynamic random access storage element providing memory cells for storage and access of data words, the memory cells arranged in addressable logical rows and columns, the storage and access of data occurring at locations according to address words;
      a serial interface communicating with the at least one dynamic random access storage element and providing serial communication of memory access words including data words and address words communicated between the at least one dynamic random access storage element and the circuitry outside the package housing through at least one pin, the serial interface operating to allow read and write access to the at least one dynamic random access storage element according to data words and address words of the serially communicated memory access words, wherein bits of each given data word are predominantly communicated at different sequential times and the bits of each given address word of the memory access words are predominantly communicated at different sequential times;
      wherein the at least one dynamic random access storage element responds to given address words of the memory access words from the serial interface to provide access to storage elements matching the given address words using corresponding given data words of the memory access words;

wherein the serial interface provides multiple lanes each providing a bit rate of memory access words through a corresponding of the at least one pin of at least 10 Gb per second; and wherein each lane transmits bits according to an independent clock for the lane provided by an embedded clock protocol within the transmitted data of the lane.

2. The electronic memory device of claim 1 wherein the at least one dynamic random access storage element includes multiple dynamic access storage elements and further including a decoder monitoring the address words to steer the memory access data selectively to particular different ones of the multiple dynamic storage elements.

3. The electronic memory device of claim 2 wherein the decoder produces chip enable inputs to the multiple dynamic storage elements.

4. The electronic memory device of claim 1 wherein the serial interface communicates with the circuitry outside the package housing through at least two pins each providing a lane of the multiple independent lanes for serial communication.

5. The electronic memory device of claim 1 further including an address mask circuit within the package housing selecting only a portion of an address word received through the at least one pin, wherein the address mask communicates with additional pins to receive address filter inputs describing a subset of addresses and wherein the serial interface communicates with the address filter to provide access to the at least one random access storage element only for addresses within the subset of addresses;

whereby multiple electronic memory devices may share a given serial computer memory bus as defined by different address filter inputs from the additional pins.

6. The electronic memory device of claim 1 wherein the serial interface decodes the serially communicated memory access words into parallel address and data lines communicating with a parallel interface of the at least one random access memory element.

7. The electronic memory device of claim 1 wherein each lane provides transmission of data in the form of a low-voltage differential transmission on a conductor pair.

8. The electronic memory device of claim 1 wherein the serial interface provides a latency of greater than 13 ns.

9. The electronic memory device of claim 1 wherein the serial interface employs packet transmission in which multiple bits of memory access words are transmitted in series as packets having header data and error correction data.

10. The electronic memory device of claim 1 wherein the memory access words have a bit length exceeding a number of pins of the housing.

11. The electronic memory device of claim 1 wherein each column address accesses a row of memory cells having access width and wherein the data word equals the access width.

12. An electronic memory device comprising:

a package housing providing a set of pins allowing electrical communication from circuitry within the package housing to circuitry outside of the package housing; and a circuit held within the package housing and including:
multiple dynamic random access storage elements providing memory cells for storage and access of data words, the memory cells arranged in addressable logical rows and columns, the storage and access of data occurring at locations according to address words;

a serial interface communicating with the multiple dynamic random access storage elements providing serial communication of memory access words including data words and address words communicated between the dynamic random access storage element and the circuitry outside the package housing through at least one pin, the serial interface operating to allow read and write access to the dynamic random access storage element according to data words and address words of the serially communicated memory access words, wherein the bits of each given data word are predominantly communicated at different sequential times and the bits of each given address word of the memory access words are predominantly communicated at different sequential times;

wherein the multiple dynamic random access storage elements respond to given address words of the memory access words from the serial interface to provide access to storage elements matching the given address words using corresponding given data words of the memory access words; and wherein the serial interface provides a bit rate of memory access words through the at least one pin of at least 10 Gb per second;

further including a decoder monitoring the address words to steer data selectively to particular different ones of the multiple dynamic storage elements.

13. The electronic memory device of claim 1 wherein the decoder produces chip enable inputs to the multiple dynamic storage elements.

14. An electronic computer comprising:

(a) an electronic memory device having:

a package housing providing a set of pins allowing electrical communication from circuitry within the package housing to circuitry outside of the package housing; and a circuit held within the package housing and including:
at least one dynamic random access storage element providing memory cells for storage and access of data words, the memory cells arranged in addressable logical rows and columns, the storage and access of data occurring at locations according to address words;

a serial interface communicating with the at least one dynamic random access storage element and providing serial communication of memory access words including data words and address words communicated between the at least one dynamic random access storage element and the circuitry outside the package housing through at least one pin, the serial interface operating to allow read and write access to the at least one dynamic random access storage element according to data words and address words of the serially communicated memory access words, wherein the bits of each given data word are predominantly communicated at different sequential times and the bits of each given address word of the memory access words are predominantly communicated at different sequential times;

wherein the at least one dynamic random access storage element responds to given address words of the memory access words from the serial interface to provide access to storage elements matching the given address words using corresponding given data words of the memory access words;

wherein the serial interface provides multiple lanes each providing a bit rate of memory access words through a corresponding of the at least one pin of at least 10 Gb per second; and wherein each lane transmits bits according to an independent clock for the lane provided by an embedded clock protocol within the transmitted data of the lane; and (b) at least one computer processor providing circuitry outside of the package housing and communicating with the electronic memory over the multiple lanes via the serial interface; wherein the serial interface communicates with the at least one dynamic random access storage element over a parallel interface, the parallel interface providing communication of memory access words including data words and address words in parallel, wherein the bits of each given data word are predominantly communicated at a same time and the bits of each given address word of the memory access words are predominantly communicated a same time.

* * * * *